US012787075B2

(12) United States Patent
Wang et al.

(10) Patent No.: US 12,787,075 B2
(45) Date of Patent: Nov. 3, 2026

(54) METHODS FOR READER COVERAGE EXTENSION FOR AIoT COMMUNICATION

(71) Applicant: InterDigital Patent Holdings, Inc., Wilmington, DE (US)

(72) Inventors: Guanzhou Wang, Brossard (CA); Michael Starsinic, Newtown, PA (US); Alec Brusilovsky, Downingtown, PA (US); Anuj Sethi, Ottawa (CA); Samir Ferdi, Kirkland (CA); Mohamad Kenan Al-Hares, Canterbury (GB); Jung Je Son, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 160 days.

(21) Appl. No.: 18/798,188

(22) Filed: Aug. 8, 2024

(65) Prior Publication Data

US 2026/0046943 A1 Feb. 12, 2026

(51) Int. Cl.

*H04W 76/10* (2018.01)
*H04W 48/10* (2009.01)
*H04W 76/27* (2018.01)

(52) U.S. Cl.

CPC ........... *H04W 76/10* (2018.02); *H04W 48/10* (2013.01); *H04W 76/27* (2018.02)

(58) Field of Classification Search

CPC ...... H04W 76/10; H04W 48/10; H04W 76/27
See application file for complete search history.

(56) References Cited

U.S. PATENT DOCUMENTS

| | | | | |
|---|---|---|---|---|
| 12,346,766 B1 * | 7/2025 | Wang | | H04W 12/037 |
| 2025/0350939 A1 * | 11/2025 | Kunz | | H04W 12/0431 |
| 2026/0040277 A1 * | 2/2026 | Hong | | H04W 4/70 |

FOREIGN PATENT DOCUMENTS

| | | | | | |
|---|---|---|---|---|---|
| CN | 120786635 A | * | 10/2025 | | H04W 72/541 |
| CN | 120935520 A | * | 11/2025 | | H04W 4/30 |
| CN | 121037865 A | * | 11/2025 | | H04W 84/18 |
| CN | 121284588 A | * | 1/2026 | | H04W 24/02 |
| CN | 121729910 A | * | 3/2026 | | H04W 12/69 |
| GB | 2636724 A | * | 7/2025 | | H04W 64/00 |
| GB | 2642875 A | * | 1/2026 | | H04W 56/0015 |
| WO | WO-2025032092 A1 | * | 2/2025 | | H04L 69/24 |
| WO | 2025174846 A1 | | 8/2025 | | |
| WO | WO-2025231913 A1 | * | 11/2025 | | H04W 24/02 |
| WO | WO-2026004087 A1 | * | 1/2026 | | H04W 36/00 |

(Continued)

OTHER PUBLICATIONS

Oppo, "New SID: Study on Architecture support of Ambient power-enabled Internet of Things," 3GPP SA#102, SP-231803, Edinburgh, UK (Dec. 11-15, 2023).

(Continued)

*Primary Examiner* — Kenny S Lin
(74) *Attorney, Agent, or Firm* — Volpe Koenig

(57) ABSTRACT

One or more devices, methods, and/or systems may be designed to implement communication with ambient internet of things (AIoT) devices in low or no-energy scenarios. For example, a reader may send a signal to one or more AIoT devices, then at least one of the one or more AIoT devices may response. The reader may be configured such that it can send the response of the at least one AIoT device to a network.

15 Claims, 10 Drawing Sheets

(56) References Cited

FOREIGN PATENT DOCUMENTS

| | | | | |
|---|---|---|---|---|
| WO | WO-2026004095 A1 * | 1/2026 | ........ | H04W 74/0833 |
| WO | WO-2026011392 A1 * | 1/2026 | ............ | H04W 60/00 |

OTHER PUBLICATIONS

Third Generation Partnership Project, "Technical Specification Group Services and System Aspects; System Architecture for the 5G System; Stage 2 (Release 18)," 3GPP TS 23.501 V18.6.0 (Jun. 2024).
Third Generation Partnership Project, "Technical Specification Group Services and System Aspects; System architecture for the 5G System (5GS); Stage 2 (Release 19)," 3GPP TS 23.501 V19.0.0 (Jun. 2024).
Third Generation Partnership Project, "Technical Specification Group Services and System Aspects; Procedures for the 5G System (5GS); Stage 2 (Release 18)," 3GPP TS 23.502 V18.6.0 (Jun. 2024).
Third Generation Partnership Project, "Technical Specification Group Services and System Aspects; Procedures for the 5G System (5GS); Stage 2 (Release 19)," 3GPP TS 23.502 V19.0.0 (Jun. 2024).
Third Generation Partnership Project, "Technical Specification Group Services and System Aspects; Study on Architecture support of Ambient power-enabled Internet of Things (Release 19)," 3GPP TR 23.700-13 V0.4.0 (Jun. 2024).
Third Generation Partnership Project, "Technical Specification Group Radio Access Network; Study on Ambient IoT (Internet of Things) in RAN (Release 18)," 3GPP TR 38.848 V18.0.0 (Sep. 2023).
Third Generation Partnership Project, "Technical Specification Group Radio Access Network; NR; NR and NG-RAN Overall Description; Stage 2 (Release 18)," 3GPP TS 38.300 V18.2.0 (Jun. 2024).
Third Generation Partnership Project, "Technical Specification Group Radio Access Network; NR; User Equipment (UE) procedures in Idle mode and RRC Inactive state (Release 18)," 3GPP TS 38.304 V18.2.0 (Jun. 2024).
Interdigital Inc., "Key Issue #2, New Solution: UE Assisted Paging for AIoT devices," SA WG2 Meeting #163, S2-2406744, Jeju, Korea (May 27-31, 2024).
Interdigital Inc., "Use Cases and Stage 2 Procedure Flow for Ambient IOT," 3GPP Ran WG2 Meeting #125bis, R2-2402392, Changsha, China (Apr. 15-19, 20204).
Oppo, "KI#3, solution#11: Update on solution#11," SA WG2 Meeting #163, S2-2406148, Jeju, Korea (May 27-31, 2024).
Third Generation Partnership Project, "Technical Specification Group Services and System Aspects; Study on Architecture support of Ambient power-enabled Internet of Things (Release 19)," 3GPP TR 23.700-13 V0.2.0 (Mar. 2024).

* cited by examiner

METHODS FOR READER COVERAGE EXTENSION FOR AIoT COMMUNICATION

BACKGROUND

Internet of Things (IoT) devices may be utilized in circumstances where a use case has low-energy or no-energy resources available. For example, in keeping track of inventory, IoT devices may be utilized. There is a need for one or more methods, devices, and/or systems to facilitate communication with IoT devices into larger communications networks, such as cellular networks.

SUMMARY

One or more devices, methods, and/or systems may be designed to implement communication with ambient internet of things (AIoT) devices in low or no-energy scenarios. For example, a reader may send a signal to one or more AIoT devices, then at least one of the one or more AIoT devices may response. The reader may be configured such that it can send the response of the at least one AIoT device to a network.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

As described herein, one or more of the following acronyms may be used: 5G System (5GS), 5G S-Temporary Mobile Subscription Identifier (5G-S-TMSI), Application Function (AF), Access and Mobility Management Function (AMF), Ambient-powered Internet of Things (AIoT), Application Server (AS), Backscattering Communication (BC), Backscattering Device (BD), Base Station (BS), Core Network (CN), Downlink (DL), Non-Access Stratum (NAS), Network Exposure Function (NEF), Public Land Mobile Network (PLMN), Paging Occasion (PO), Radio Access Network (RAN), Radio Resource Configuration (RRC), System Information Broadcast (SIB), Temporary Mobile Subscription Identifier (TMSI), User Equipment (UE), Uplink (UL).

Figure 1A:
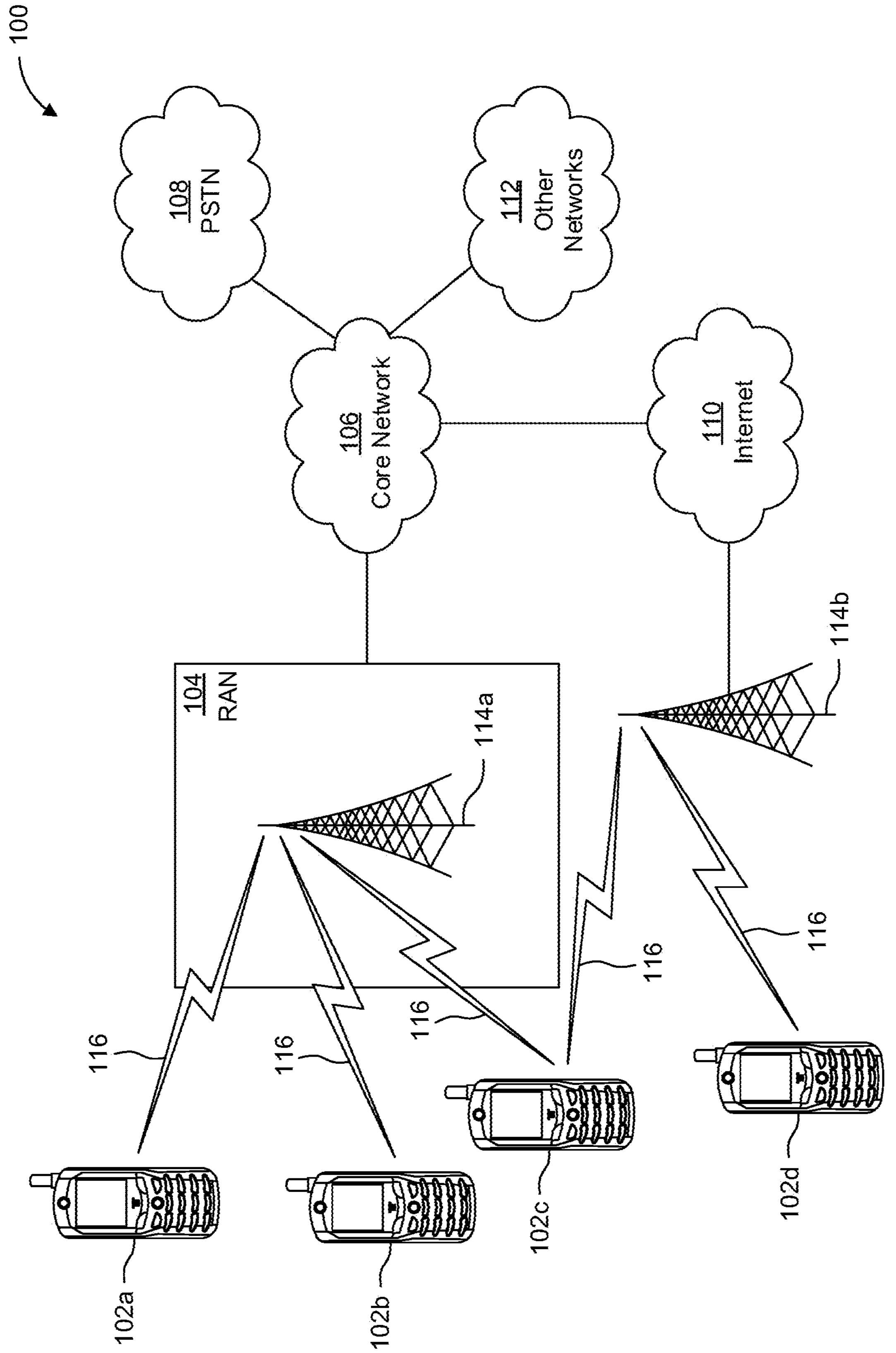
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, such as one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
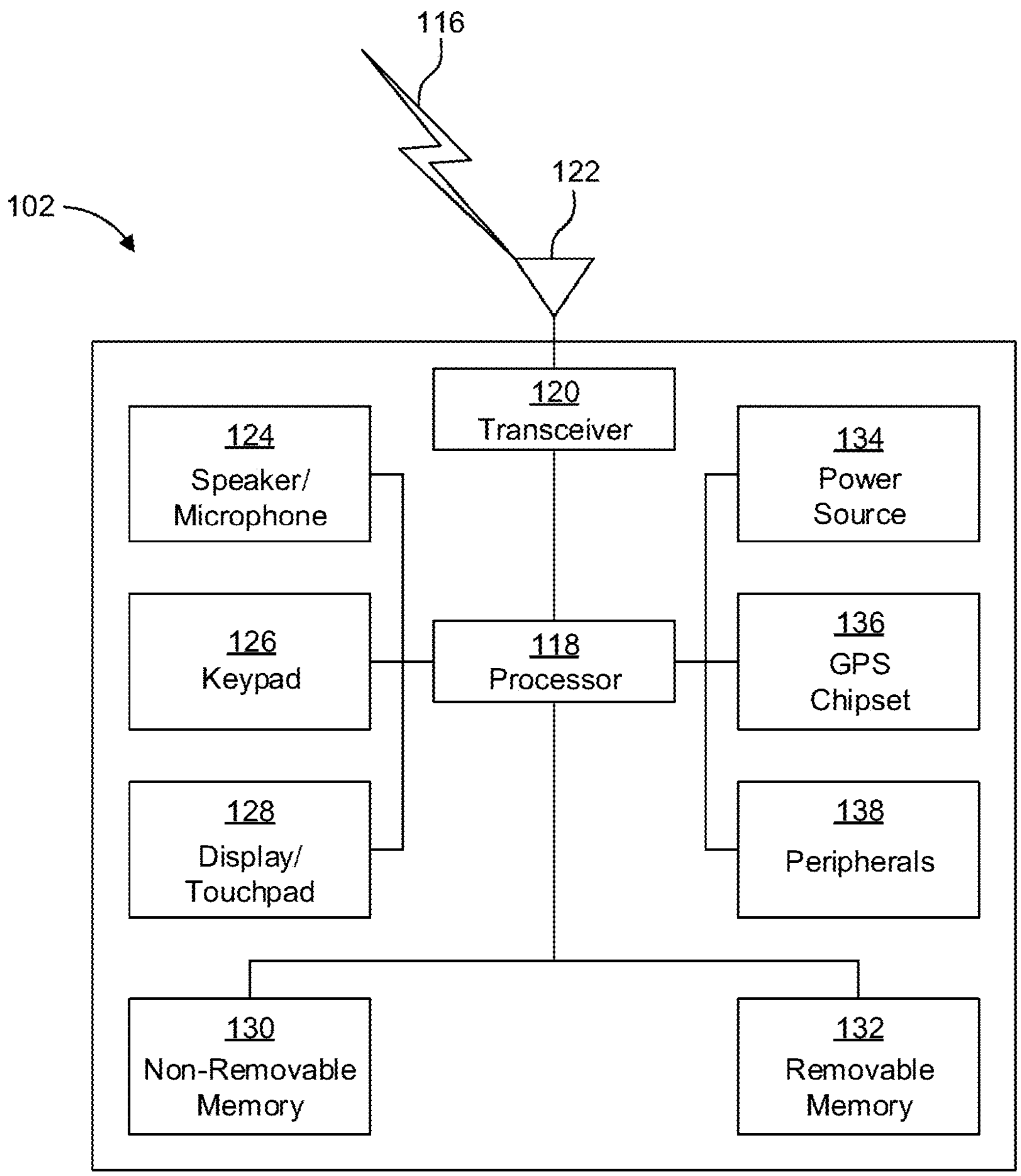
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
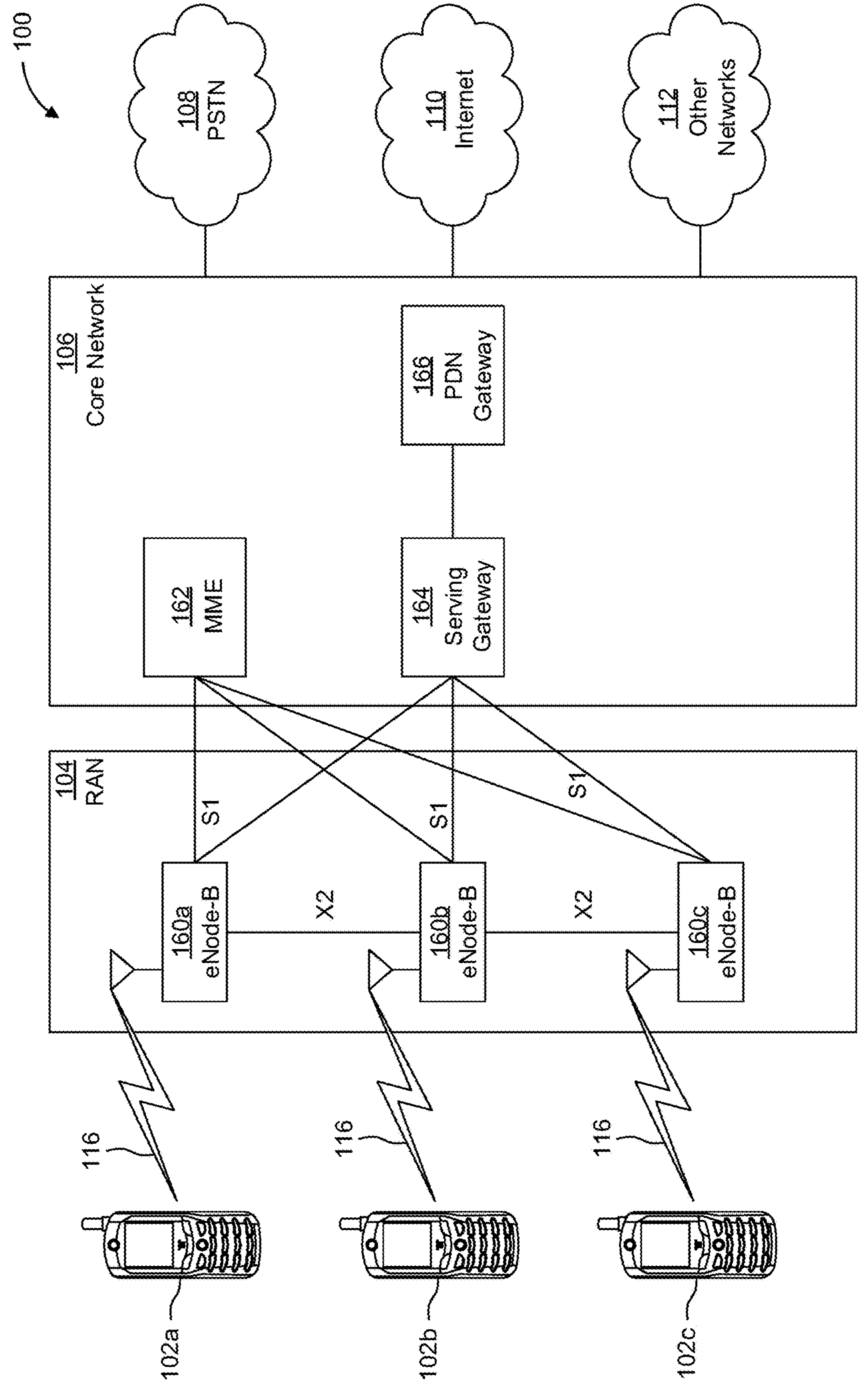
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
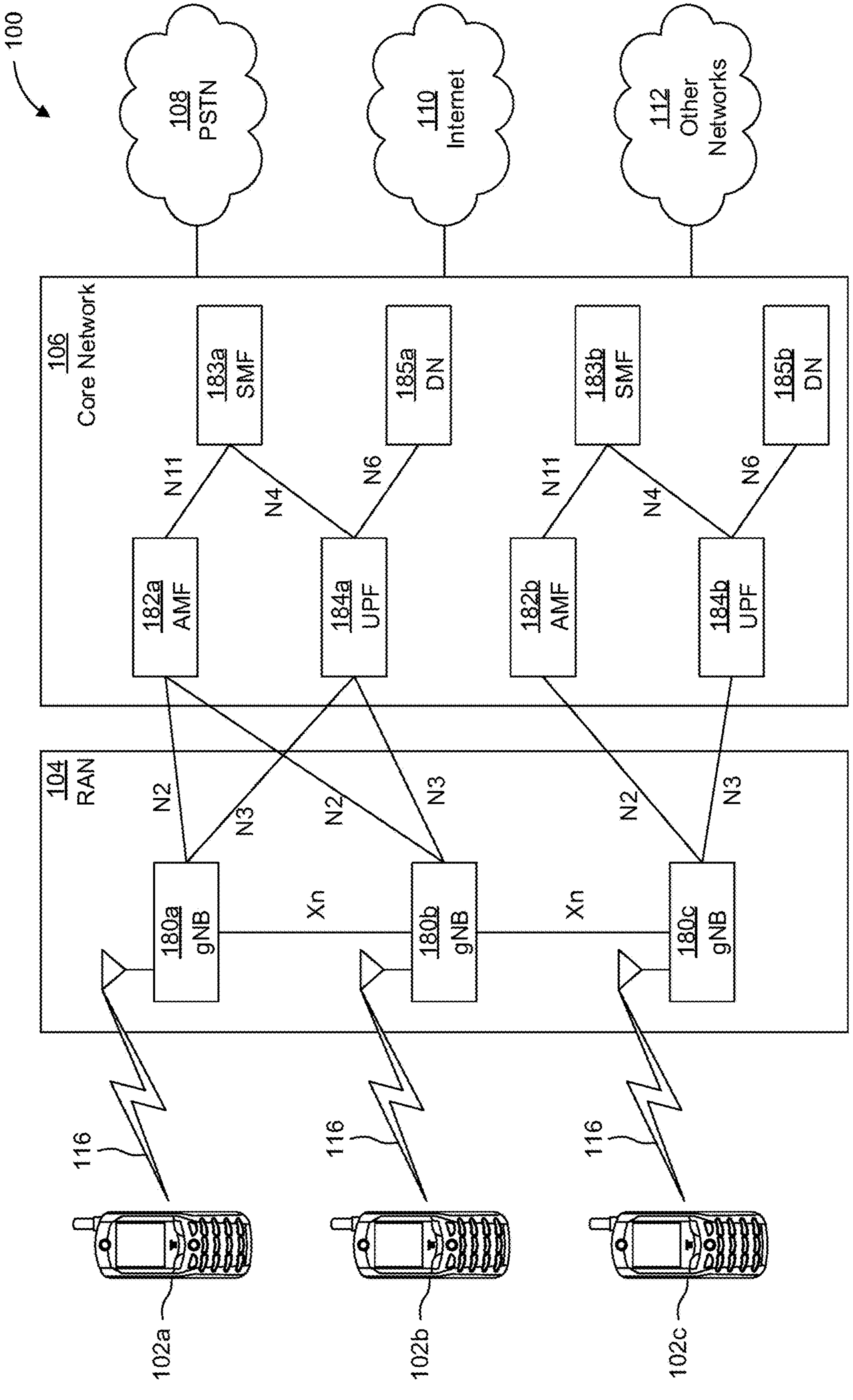
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In view of FIGS. 1A-1D, and the corresponding description of FIGS. 1A-1D, one or more, or all, WTRUs 102*a-d*, may be an Ambient-power enabled IoT device(s) (AIoT). Additionally/alternatively, one or more, or all, WTRUs 102*a-d*, may be a reader and/or a transmitter for an AIoT device. Additionally/alternatively, one or more, or all, of the base stations (e.g., eNB, gNB, etc.) may be a reader and/or a transmitter for an AIoT device.

An AIoT device is a kind of IoT device that can harvest energy from the environment, such as wireless radio waves, motion, vibration, piezoelectricity, solar, and/or wind power, etc. As described herein, AIoT, AIoT device, IoT, and IoT device may be interchangeable. An AIoT device may be battery-less or have limited energy storage (e.g., using a capacitor). An example of one use case for an AIoT device may in an Industrial Wireless Sensor Networks where the environment is harsh (e.g., extremely high or low temperature), where devices may benefit from being battery-less, maintenance-free, and/or having a long service life. Another example use case for an AIoT device may be in smart logistics and smart warehousing (e.g., where small IoT devices may be utilized). The low-cost, small-form, batterylessness and/or durability may make an AIoT suitable to be attached to large amounts of goods and facilitate more efficient goods identifying, sorting, tracking, inventory, etc.

Generally, a "reader", in the context of AIoT communication, is an entity or device that is able to communicate with AIoT devices over air interface (e.g., using backscattering communication, etc.). A reader may be a Base Station (BS-reader) or a WTRU (WTRU-reader).

A BS-reader is a Base Station (BS) that is capable of communicating with one or more AIoT devices (e.g., "reading" the IoT device, which may involve transmitting and/or receiving). A BS-reader may be interchangeable with base station. A BS-reader may receive a request from a core network node or an application function, send an initial transmission of the request over an air interface, and/or receive a response from one or more AIoT devices. As described herein, "network" may refer to, and be interchangeable with, any node (e.g., core network node, etc.), entity, device, and/or function as it relates to the overall infrastructure that a WTRU may connect to (e.g., as described with regard to FIGS. 1A-1D, and elsewhere herein).

A WTRU-reader is a WTRU that is capable of communicating with one or more AIoT devices. A WTRU-reader may be interchangeable with WTRU. A WTRU-reader may receive a request from the network or a BS-reader, re-transmit the request or some of the information in the request over an air interface (e.g., between the WTRU and AIoT devices), receive a response, and re-transmit the response or some of the information in the response over an air interface (e.g., between the WTRU and BS-reader or network). In some instances, a WTRU-reader may be called an intermediate node.

In some cases, backscattering communication may be used to enable AIoT devices to send information. In an example backscattering communication scenario, a transmitter generates a radio signal, which is reflected/modulated/utilized by the backscattering device (BD), and is then received at the reader. The received signal at the BD from the transmitter may be used for one or more purposes, such as to power up the circuitry of the backscatter device and/or to carry the information to the reader in the form of the modulated signal. The transmitter and the reader may be co-located at the same entity, such as a RAN node (e.g., BS, etc.) or a WTRU; or the transmitter and the reader may be at different entities. For example, a RAN node may act as a transmitter, and another WTRU may act as a reader; or a first WTRU may act as a transmitter and a second WTRU may act as a reader; etc.

Figure 2:
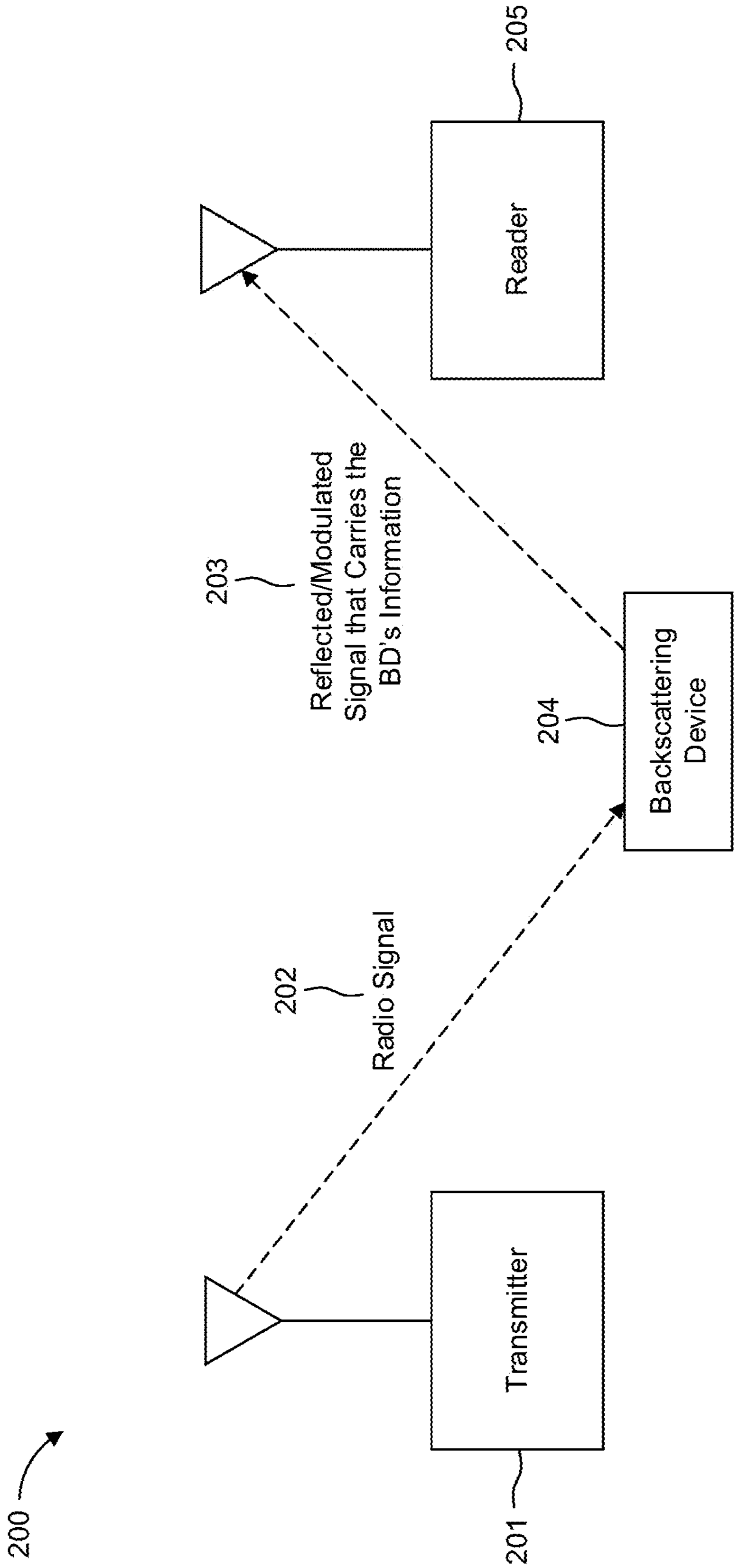
FIG. 2 illustrates an example of backscattering communication (BC)

FIG. 2 illustrates an example of backscattering communication (BC). As shown, the transmitter 201 may send a radio signal 202 to a backscattering device (BD) 204. The BD 204 may reflect, modulate, and/or utilize the radio signal 202 to send a signal 203 that carries information from the BD 204 to a reader 205. AIoT devices may utilize Backscattering Communication (BC) to send information to a receiving device ("reader"). In one instance, the transmitter 201 and the reader 205 may be different devices. In one instance, not shown, the transmitter 201 and the reader 205 may be a part of the same device. In one instance, the BD 204 may be one or more AIoT device(s).

In some cases a WTRU-reader may obtain a temporary identifier associated with an AIoT service. A network and the WTRU-reader may use this temporary identifier to calculate paging occasions on which the network may deliver AIoT service related paging messages.

For AIoT devices that depend on backscattering communication, if the AIoT device is far from the radio signal source, the received radio signal may already be weak due to path loss and it may be further attenuated after the reflection, unless an amplifier is used. The communication range of AIoT devices may be limited due to this consideration; in other words, they may not be far from the radio signal sources, and/or the reader may also need to be in close range. In some instances (e.g., NR use cases), it may be desirable for DL/UL coverage range to be 10~50 m for indoor and 50~500 m for outdoor, which further demonstrates a need to consider the communication range for AIoT devices.

In some AIoT service scenarios, AIoT devices may need to be deployed in a relatively large space, such as a big warehouse (e.g., for inventory) or an airport tarmac (e.g., asset tracking), and it may be impossible or not economical to deploy BS-readers (e.g., Base Stations) in high-density to make sure every AIoT device has one reader in its communication range. In such cases, there may be frequent communication failures due to this range limit problem. For example, when a reader transmits an inventory command/trigger over the air interface, the reader may not be able to receive the response(s) from those AIoT device(s) that are out of communication range. Thus, the 5GS for AIoT devices and services needs to support reader coverage that takes into consideration the constraints and limitations of the Ambient IOT system, such as power consumption, cost effectiveness, and economies of scale.

Given these and other issues, there is a need for extending AIoT reader coverage using one or more mechanisms. For example, extending coverage can be accomplished by having multiple WTRU-readers deployed in a BS-reader's coverage area, where the WTRU-readers may assist the BS-reader in performing AIoT communication. The WTRUs may use some sort of messaging, such as paging, system information blocks, or the like, to extend the coverage.

Additionally/alternatively, given that the communication range of the AIoT system is mostly limited by the energy constrains of the AIoT device, the AIoT device that depends on external unscheduled energy sources (e.g., similar to RFID in their energy harvesting) may benefit from prolonged and/or targeted exposure to the energizing RF. For example, an entity (e.g., the operators'Core Network, AIoT AF, AIoT reader, BS, WTRU, or some combination thereof) may make a determination to expose one or more (e.g., a group or set) AIoT devices to an amount of RF energy for a prolonged period of time (e.g., relative to some norm; e.g., a set period of time, or at least a period of time greater than a threshold, etc.) to allow better energy recuperation. For instance, the entity may instruct the a reader to form beams towards the location of the target AIoT device(s) for a set amount of time to allow those devices to perform energy harvesting more efficiently. Additionally/alternatively, the entity may instruct the a reader to form a set number of beams towards the location of the target AIoT device(s) to allow those devices to perform energy harvesting more efficiently. In one instance the beams may be formed at a determined power level. The beams and/or the time period determination may be based on one or more factors. The change of beams and/or the time period determination may be triggered by one or more triggers.

Generally, for extending coverage there may be a procedure for an AIoT system (e.g., such as those disclosed herein) where a BS and WTRU work in concert to facilitate communication between one or more AIoT devices and a network. For example, initially, WTRU-readers and BS-reader may be authorized by the network (e.g., AIoT Function) to act as AIoT readers. Additionally/alternatively, the network may receive a AIoT service request from the AIoT AS. Additionally/alternatively, the request may include target AIoT device ID or group ID and a target area. Additionally/alternatively, the request may be forwarded by the NEF to the AIoT Function. Additionally/alternatively, the AIoT Function may locate the BS-reader (e.g., based on the target area included in the AIoT service request) and forward the AIoT service request to the BS-reader. Additionally/alternatively, the BS-reader may start sending AIoT specific messaging. Additionally/alternatively, the WTRU-reader may acquire the AIoT specific messaging. Additionally/alternatively, the WTRU-reader may broadcast the device triggering message, which may include the device ID(s) and service request content received in the AIoT specific messaging, over the air interface towards the AIoT devices. Additionally/alternatively, the target AIoT devices may receive the device triggering message and send a response message, e.g., via AIoT Random Access procedure. Additionally/alternatively, If the WTRU-reader is in IDLE state, it may initiate the RRC Connection with the BS-reader, and include the received device response message in the RRC Connection Request. Additionally/alternatively, the WTRU may indicate that the cause for requesting RRC connection is for AIoT communication. Additionally/alternatively, if the WTRU-reader is in a connected state, it may send a RRC message to the BS-reader and include the received device response message in the RRC message. Additionally/alternatively, the BS-reader forwards the received device response message to the network (e.g., AIoT Function) which may further forward it to the AIoT AS. Additionally/alternatively, it is possible that the BS-reader receives duplicate device response messages from multiple WTRU-readers and the BS-reader may purge the duplicate responses and only send one copy of the device response to the network. Additionally/alternatively, As the WTRU-reader indicates the cause for RRC connection establishment is for AIoT communication, the BS-reader may release the RRC connection shortly after it has received the device response message from the WTRU-reader. After the release, the WTRU-reader may return to IDLE state and may monitor for appropriate signaling (e.g., as described herein). As described herein, any one of the above steps may be optional. Additionally, any one of the above steps may apply to or be combined with one or more steps of one or more examples described herein.

In one example, there may be a method implemented by a wireless transmit receive unit (WTRU). The WTRU may include a processor operatively coupled to a transceiver. For instance, the WTRU may be similar or the same as described with relation to any of the figures described herein. In one instance, the processor and transceiver may be configured to perform one or more actions. The WTRU may be configured by the network (e.g., node, base station, function, entity, etc.). Additionally/alternatively, the WTRU may receive an authorization message from a network function, wherein the authorization message indicates an authorization for the WTRU to act as an ambient internet of things (AIoT) reader. Additionally/alternatively, the WTRU may receive AIoT specific messaging from a base station. Additionally/alternatively, the WTRU may broadcast a trigger message to one or more AIoT devices. Additionally/alternatively, the WTRU may receive a response message from the one or more AIoT devices. Additionally/alternatively, the WTRU may forward the response message to the base station. Additionally/alternatively, the trigger message may include one or more device IDs of the one or more AIoT devices. Additionally/alternatively, the AIoT specific messaging may include a service request, wherein the trigger message includes the service request. Additionally/alternatively, the WTRU may be in an IDLE state when receiving the response message, and the WTRU sends an RRC connection request to the base station prior to the forwarding, wherein the RRC connection request indicates that the RRC connection request is associated with an AIoT response. Additionally/alternatively, the WTRU may return to an IDLE state after forwarding the response message to the base station. Additionally/alternatively, the AIoT specific messaging may be a paging message. Additionally/alternatively, the AIoT specific messaging may be a system information block.

Figure 3:
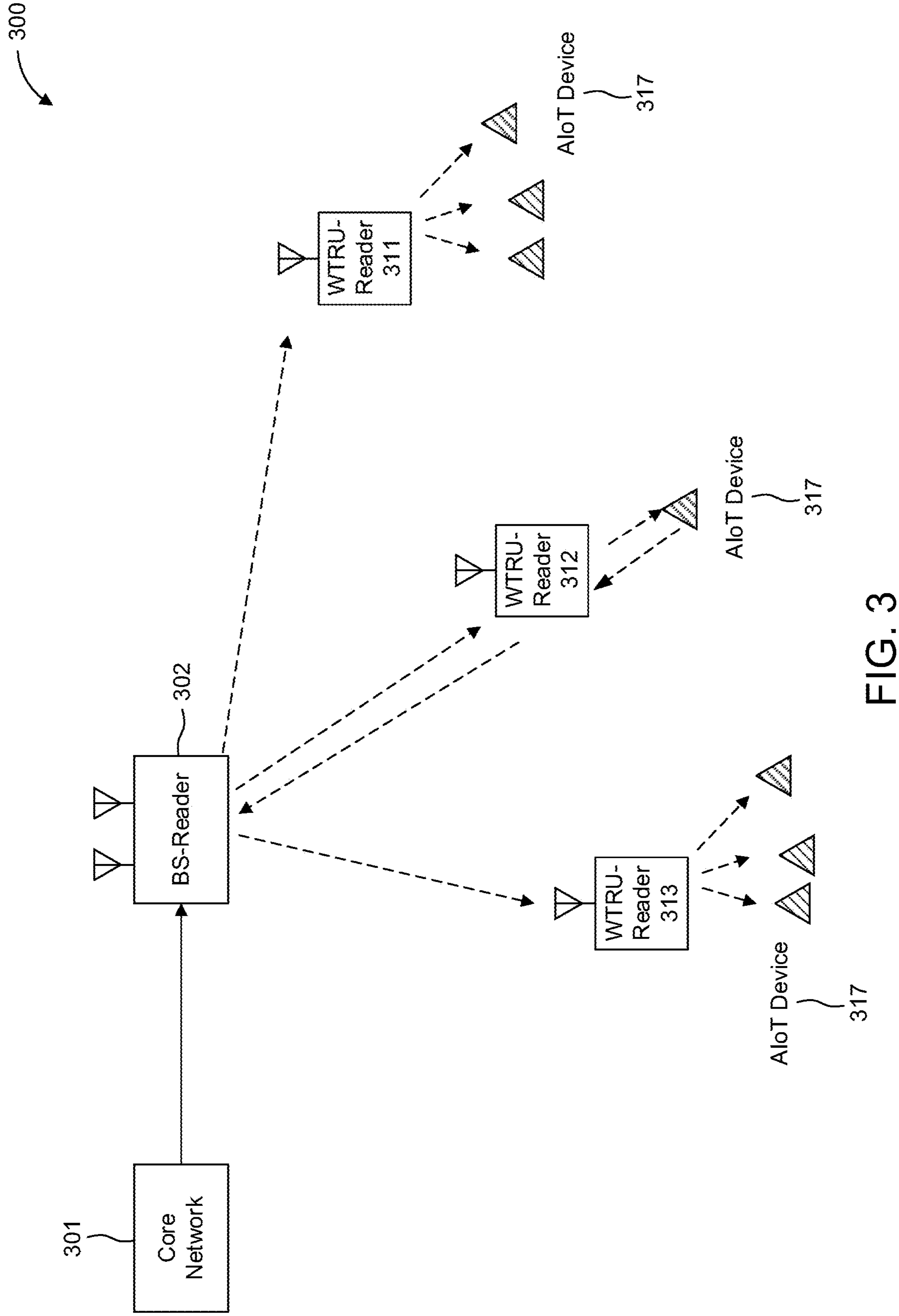
FIG. 3 illustrates an example of AIoT reader coverage extension.

FIG. 3 illustrates an example of AIoT reader coverage extension. As shown, there may be a core network 301, a BS-reader 302, and one or more number of WTRU-readers, such as 311, 312, and 313 as shown. Each WTRU-reader may provide coverage for one or more AIoT device 317. This architecture 300 may extend AIoT reader coverage, thereby increasing the likelihood that any given AIoT device is covered where there are a limited number of BSs.

In some cases, AIoT reader coverage may be extended via paging. In this approach, it may be assumed that there are one or multiple BS-readers that cover an AIoT service area where multiple AIoT devices are deployed. It may also be assumed that multiple WTRU-readers may be deployed in the area that will assist the AIoT communication. The WTRU-readers may be fixed-terminals or usual mobile WTRUs that can roam in the area. The deployment of multiple WTRU-readers may be considered to be more cost effective than deploying high-density BS-readers.

When a BS-reader receives a AIoT service request (e.g., for an inventory use case, this may be an inventory request) from the network, the BS may broadcast a AIoT Service-specific Paging message. The audience (e.g., intended recipients) of this AIoT Service-specific Paging message is not the AIoT devices, but the WTRU-readers (or Intermediate Nodes) that are in the coverage. If the WTRU-readers receive the AIoT Service-specific Paging message, they may broadcast AIoT device trigger/paging message which may be received by the target AIoT devices in its vicinity. After the receipt, processing, and e.g., reflection back the AIoT device response, the WTRU-reader may forward the received AIoT device response to the BS-reader.

Both the BS-reader and the WTRU-readers may be configured with the same AIoT Service-specific Paging Cycle and the same AIoT service-specific identity that may be used to calculate the paging Occasion within a paging Cycle.

The BS-reader may receive the AIoT Service-specific Paging Cycle and AIoT Service-specific Identity when it receives the AIoT service request from the network (e.g., AIoT Function, AMF, and/or some other network entity). The BS-reader may also receive the duration of AIoT Service-specific Paging, and/or number of repeated Paging Cycle, for each AIoT service request, from the network.

The WTRU-readers may receive the AIoT Service-specific Paging Cycle and AIoT Service-specific Identity from the network when it is authorized by the network to act as a WTRU-reader. If a WTRU-reader supports multiple AIoT services, it may be configured with multiple pairs of AIoT Service-specific Paging Cycle and AIoT Service-specific Identity for each AIoT Service. In this case, the WTRU-reader may need to monitor multiple AIoT Service-specific paging occasions. It is also possible that multiple AIoT services may share the same AIoT service-specific paging information and thus the same paging occasions.

The AIoT Service-specific Identity may be in the form of a 5G-S-TMSI so the same mechanism of a paging occasion calculation as the normal WTRU paging may be (re)used.

The WTRU-readers may start monitoring AIoT Service-specific Paging on the calculated AIoT Service-specific paging occasion per AIoT Service-specific Paging Cycle (e.g., after it has been authorized as WTRU-readers). Or, they may start monitoring AIoT Service-specific Paging after entering "AIoT Service Mode" or "reader Mode", which may be controlled by the network. For example, the network may send a DL NAS message to the authorized WTRU-readers in a certain area and activate them to enter a reader mode. The network may also page the authorized WTRU-readers (normal WTRU paging) and include a special indication in the Paging message to trigger the WTRU-readers to enter "reader Mode".

The AIoT Service-specific Paging message that WTRU-readers may receive from the BS-reader may include one or more of the following information: target AIoT device ID or AIoT device group ID; AIoT service request payload (e.g., Inventory Request, AIoT Command, etc.); and/or, a timer value which indicates for how long the BS-reader will wait for the responses from WTRU-readers.

After receiving the AIoT Service-specific Paging, the WTRU-readers may start broadcasting AIoT device trigger messages on the frequency spectrum/resource assigned for "AIoT reader-AIoT device communication". The trigger message may include the Target AIoT device ID or group ID, and the AIoT service request payload. If one of the WTRU-readers receives the response from the target AIoT device(s), the WTRU-reader may forward the response to the BS-reader. This may require the WTRU-reader to establish the RRC Connection with the BS-reader and send the device response over the RRC message (e.g., RRC Connection Request). The WTRU-reader may indicate a cause, such as "AIoT device response" for requesting RRC Connection. And the RRC Connection may be released after the BS-reader has received the response. It is possible that duplicate responses may be received from multiple WTRU-readers, and the BS-reader may discard the duplicate responses. If the WTRU-reader already has an RRC Connection with the BS-reader the WTRU-reader may send a RRC message to the BS-reader and include the device response in the RRC message.

Figure 4:
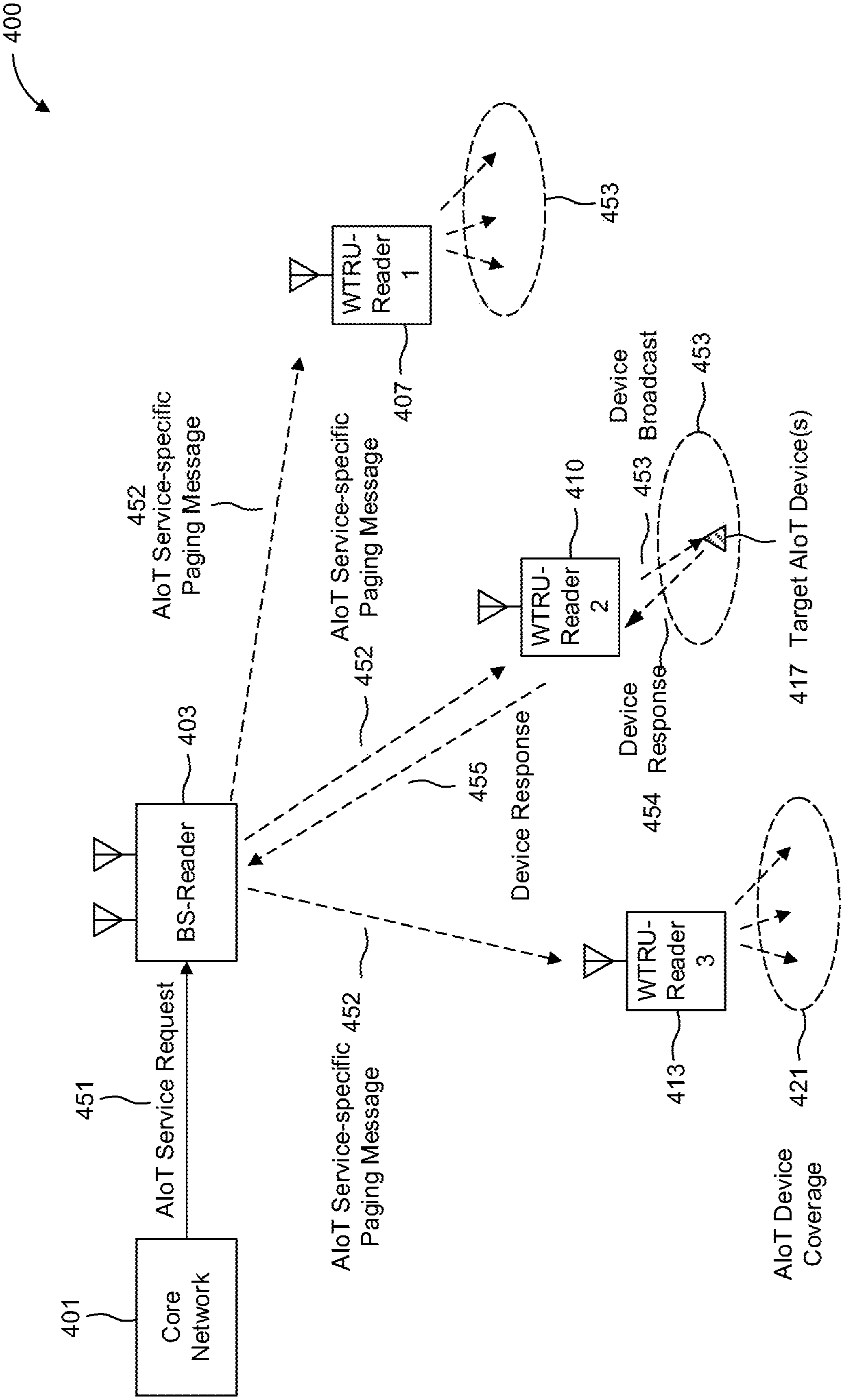
FIG. 4 illustrates an example of coverage extension using AIoT service-specific paging.

FIG. 4 illustrates an example of coverage extension using AIoT service-specific paging. As shown, in order to communicate with one or more AIoT devices 417, there may be a Core Network 401, a BS-reader 403, a first WTRU-reader 407, a second WTRU-reader 410, and a third WTRU-reader 413; in practice, there may be any number of WTRU-readers besides the number shown in the figure. Each WTRU-reader may cover one or more AIoT devices (e.g., AIoT device coverage 421). At 451, there may be an AIoT service request from the Core Network to the BS-reader. At 452, the BS-reader may send an AIoT service-specific paging message to one or more of the WTRU-readers. At 453, at a respective WTRU-reader, there may be a AIoT device trigger broadcast (e.g., triggering the IoT device to harvest energy and transmit a response). At 454, there may be an AIoT device response (e.g., sent to a respective WTRU-reader covering the given AIoT device sending the response). At 455, the respective WTRU-reader may send the AIoT device response to the BS-reader.

Figure 5:
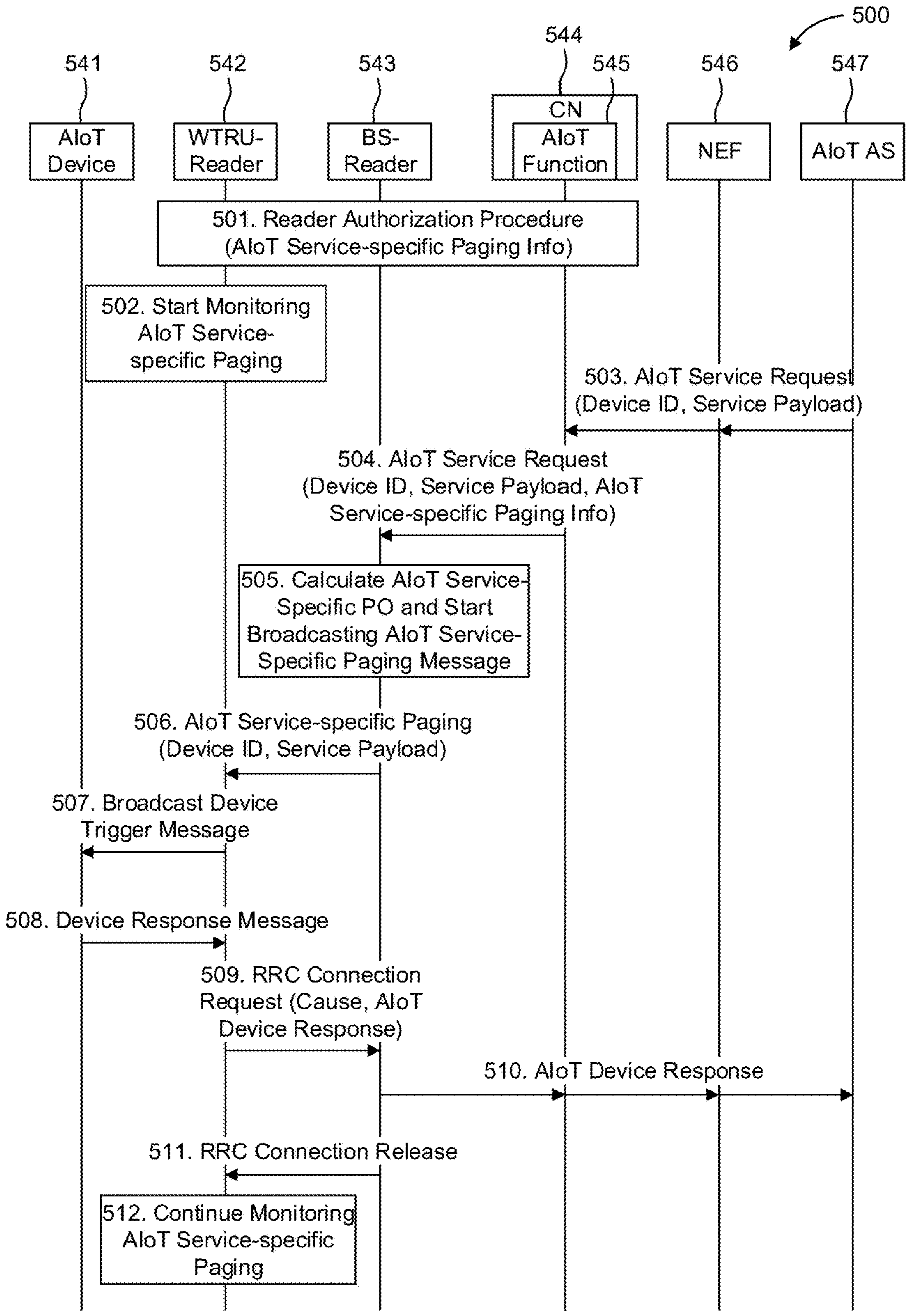
FIG. 5 illustrates an example procedure for AIoT device triggering using AIoT service specific paging.

FIG. 5 illustrates an example procedure for AIoT device triggering using AIoT service specific paging. As shown, there may be an AIoT device 541, a WTRU-reader 542, a BS-reader 543, a Core Network entity/function/node 544 (e.g., AIoT Function 545), a NEF 546, and/or an AIoT AS 547.

At 501, the WTRU-readers and BS-reader are authorized by the network (e.g., AIoT Function) to act as AIoT readers. The WTRU-readers and BS-reader may receive AIoT service specific paging information from the network. The AIoT service specific paging information may include a AIoT Service-specific Paging Cycle and a AIoT Service-specific Identity for each AIoT service.

At 502, the WTRU-readers start monitoring AIoT specific paging occasions according to the received AIoT service-specific paging information.

At 503, the network receives a AIoT service request from the AIoT AS. The request may include target AIoT device ID or group ID and a target area. The request may be forwarded by the NEF to the AIoT Function.

At 504, the AIoT Function locates the BS-reader (e.g., based on the target area included in the AIoT service request) and forwards the AIoT service request to the BS-reader. If the AIoT service-specific paging information has not been provided to the BS-reader before or needs to be updated, it may be provided along the request.

At 505, the BS-reader calculates the AIoT service-specific paging occasions according to the AIoT service-specific paging information and starts broadcasting AIoT service-specific paging in those paging occasions. The AIoT service-specific paging message may include the content of the received AIoT service request. If multiple AIoT service requests (of the same or different AIoT services) are received, the BS-reader may combine them in the Paging message.

At 506, the WTRU-reader receives the AIoT service-specific paging message.

At 507, the WTRU-reader broadcasts the device triggering message, which may include the device ID(s) and service request content that is received from the AIoT service-specific paging message, over the air interface towards the AIoT devices.

At 508, the target AIoT devices receives the device triggering message and sends a response message, e.g., via AIoT Random Access procedure.

At 509, if the WTRU-reader is in IDLE state, it may initiate the RRC Connection with the BS-reader, and include the received device response message in the RRC Connection Request. The WTRU may indicate that the cause for requesting RRC connection is for AIoT communication.

At 510, the BS-reader forwards the received device response message to the network (e.g., AIoT Function) which may further forward it to the AIoT AS. It is possible that the BS-reader receives duplicate device response messages from multiple WTRU-readers and the BS-reader may purge the duplicate responses and only send one copy of the device response to the network.

At 511, as the WTRU-reader indicates the cause for RRC connection establishment is for AIoT communication, the BS-reader may release the RRC connection shortly after it has received the device response message from the WTRU-reader.

At 512, the WTRU-reader may return to IDLE state and continue to monitor AIoT service-specific paging.

In some cases (e.g., a 5G system) a WTRU may respond to being paged by sending an initial NAS message (e.g., a service request) to the network. If the WTRU sends no initial NAS message to the network, the network may assume that the WTRU did not receive the page. The network may then retransmit the paging message in the same or in different location(s).

In a coverage extension procedure (e.g., FIG. 5, etc.), the WTRU-reader may not be expected to respond to the BS-reader page by sending an initial NAS message. Rather, the WTRU may be expected to respond only after retransmitting the AIoT paging/triggering (e.g., towards AIoT devices) and receiving a response from an Ambient IoT device. Thus, the network would only be able to detect if the WTRU received the page when, and if, the reader-WTRU forwards a response from an Ambient IoT device to the network.

Thus, in order to address this difference between one or more procedures described herein (e.g., AIoT coverage extension) and other examples where the network receives a response in response to the page, the WTRU-reader may send a Service Request to the network. The Service Request may include an indication to the network that the request for the WTRU-reader to transmit a AIoT paging message was received. The Service Request may also indicate if the WTRU-reader will or will not transmit the AIoT paging message. If the Service Request message does not also include a request to activate a PDU Session, then the WTRU-reader may return to the CM-IDLE state upon receiving a response to the Service Request.

The WTRU-reader may be triggered to send this service request message when the WTRU-reader receives the request to transmit a paging message from the BS-reader.

Alternatively, the WTRU-reader may be triggered to send this service request message after the WTRU-reader has transmitted the paging message and has determined that no device has responded to the paging message. The WTRU-reader may decide to send no service request message if the WTRU-reader has already forwarded a response to the paging message from an AIoT device to the network. In other words, forwarding the response from the AIoT device to the network may be an implicit indication to the network that the request to the transmit the paging message was received by the WTRU-reader.

An advantage to sending the Service Request to the network only after determining that no device has responded to the paging message is that, if a response is received from an AIoT device, then the transmission of the message can be avoided. An advantage of sending the Service Request immediately after receiving the request to transmit a paging message from the BS-reader, is that the BS-reader would immediately know if it needs to re-transmit the paging request.

In some instances a different message, other than a Service Request message, may be used by the WTRU-reader to indicate to the network whether the WTRU-reader will transmit the paging message.

In some cases, AIoT reader coverage may be extended via RAN system information block (SIB). In this approach, it may be assumed that multiple WTRU-readers may be deployed in the BS-reader's coverage area and WTRU-readers may assist the BS-reader in the AIoT communication.

A BS-reader may support a new SIB broadcast that carries information related to AIoT services such as the target AIoT device identifiers and the content of AIoT service request. The new SIB may be "SIB-AIoT", or any other name that distinguishes the SIB from a legacy SIB. Additionally/alternatively, the new SIB may be a modification of an existing SIB, with modified information to address the needs of an AIoT procedure. As described herein, any version of the aforementioned new SIB may be referred to as a SIB-AIoT. A BS-reader may start broadcasting or modify this SIB-AIoT when it receives AIoT Service Request from the network (e.g., the SIB-AIoT is not permanently present but only broadcasted (e.g., periodically) for a duration when the BS-reader receives AIoT service request). The periodicity and duration of the SIB-AIoT may be scheduled and/or broadcasted in an existing MIB/SIB (e.g., SIB1).

The intended receiver or audience of the SIB-AIoT may be the WTRU-readers that are in the BS-reader's coverage. There are two options that a WTRU-reader may acquire the content of the AIoT-SIB.

In a first option, the WTRU-reader may periodically read a MIB/SIB(s) to detect the presence of SIB-AIoT. If the MIB/SIB indicates the SIB-AIoT is present, the WTRU-reader may acquire SIB-AIoT according to the scheduling indicated therein.

In a second option, the BS-reader may page the WTRU-readers (e.g., using a similar/same paging mechanism described herein) and indicate in the paging message that there is imminent AIoT service request. Then the WTRU-readers may initiate on-demand SIB broadcasting to receive SIB-AIoT via broadcast or dedicated channel.

After the WTRU-readers acquire the content of SIB-AIoT that includes the AIoT service request content, they may repeat or extend the request over its air interface towards AIoT devices and forward the received responses to the BS-reader or the network (e.g., as described herein).

Figure 6:
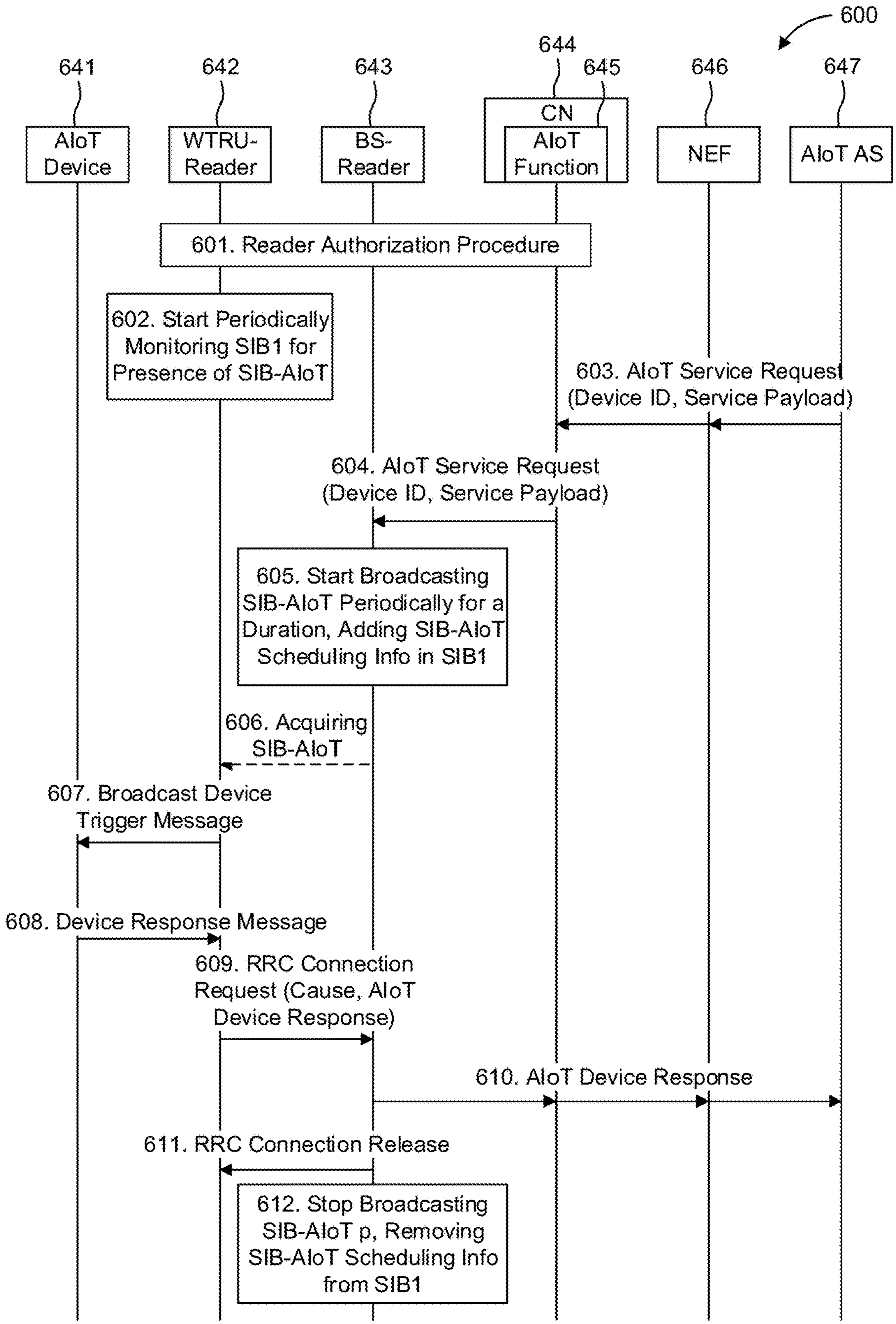
FIG. 6 illustrates an example of AIoT device triggering using SIB-AIoT via a MIB/SIB (Option 1)

FIG. 6 illustrates an example of AIoT device triggering using SIB-AIoT via a MIB/SIB (Option 1). As shown, there may be an AIoT device 641, a WTRU-reader 642, a BS-reader 643, a Core Network entity/function/node 644 (e.g., AIoT Function 645), a NEF 646, and/or an AIoT AS 647.

At 601, the WTRU-readers and BS-reader are authorized by the network (e.g., AIoT Function) to act as AIoT readers.

At 602, the WTRU-reader starts monitoring (e.g., periodically checking) SIB-1 content to check if the SIB-AIoT scheduling information is present.

At 603, the network receives a AIoT service request from the AIoT AS. The request may include target AIoT device ID or group ID and a target area. The request may be forwarded by the NEF to the AIoT Function.

At 604, the AIoT Function locates the BS-reader (e.g., based on the target area included in the AIoT service request) and forwards the AIoT service request to the BS-reader.

At 605, the BS-reader may start broadcasting SIB-AIoT which may include the content of the received AIoT service request. The BS-reader may also add the SIB-AIoT scheduling information in SIB1.

At 606, the WTRU-reader detects the change of SIB1 and notices the presence of SIB-AIoT scheduling info in SIB1. The WTRU-reader acquires SIB-AIoT content.

At 607, the WTRU-reader broadcasts the device triggering message, which may include the device ID(s) and service request content that is received from SIB-AIoT, over the air interface towards the AIoT devices.

At 608, the target AIoT devices receives the device triggering message and sends a response message, e.g., via AIoT Random Access procedure.

At 609, if the WTRU-reader is in IDLE state, it may initiate the RRC Connection with the BS-reader, and include the received device response message in the RRC Connection Request. The WTRU may indicate that the cause for requesting RRC connection is for AIoT communication.

At 610, the BS-reader forwards the received device response message to the network (e.g., AIoT Function) which may further forward it to the AIoT AS. It is possible that the BS-reader receives duplicate device response messages from multiple WTRU-readers and the BS-reader may purge the duplicate responses and only send one copy of the device response to the network.

At 611, as the WTRU-reader indicates the cause for RRC connection establishment is for AIoT communication, the BS-reader may release the RRC connection shortly after it has received the device response message from the WTRU-reader.

Figure 7:
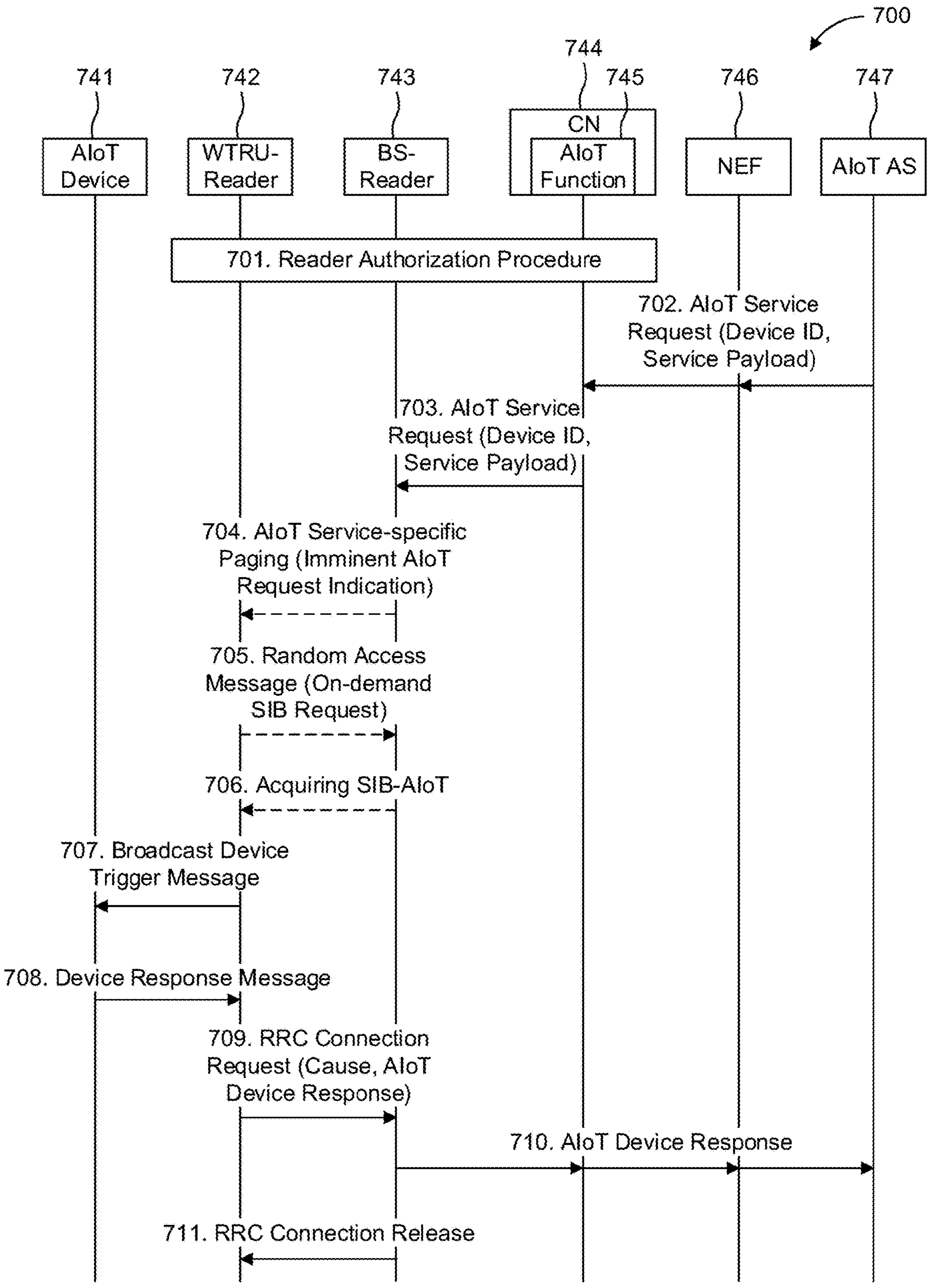
FIG. 7 illustrates an example of AIoT device triggering using SIB-AIoT via paging (Option 2).

FIG. 7 illustrates an example of AIoT device triggering using SIB-AIoT via paging (Option 2). As shown, there may be an AIoT device 741, a WTRU-reader 742, a BS-reader 743, a Core Network entity/function/node 744 (e.g., AIoT Function 745), a NEF 746, and/or an AIoT AS 747.

At 701, the WTRU-readers and BS-reader are authorized by the network (e.g., AIoT Function) to act as AIoT readers. The WTRU-readers start monitoring AIoT specific paging occasions according to the AIoT service-specific paging information received from the network.

At 702, the network receives a AIoT service request from the AIoT AS. The request may include target AIoT device ID or group ID and a target area. The request may be forwarded by the NEF to the AIoT Function.

At 703, the AIoT Function locates the BS-reader (e.g., based on the target area included in the AIoT service request) and forwards the AIoT service request to the BS-reader.

At 704, the BS-reader start broadcasting AIoT service specific Paging message, the paging message may include an indication that there is imminent AIoT service request.

At 705, the WTRU-reader that detects the AIoT service-specific Paging message may initiate on-demand SIB broadcast procedure, such as by initiating Random Access procedure and indicating on-demand SIB request.

At 706, the WTRU-reader acquires the SIB-AIoT.

At 707, the WTRU-reader broadcasts the device triggering message, which may include the device ID(s) and service request content that is received from SIB-AIoT, over the air interface towards the AIoT devices.

At 708, the target AIoT devices receives the device triggering message and sends a response message, e.g., via AIoT Random Access procedure.

At 709, if the WTRU-reader is in IDLE state, it may initiate the RRC Connection with the BS-reader, and include the received device response message in the RRC Connection Request. The WTRU may indicate that the cause for requesting RRC connection is for AIoT communication.

At 710 the BS-reader forwards the received device response message to the network (e.g., AIoT Function) which may further forward it to the AIoT AS. It is possible that the BS-reader receives duplicate device response messages from multiple WTRU-readers and the BS-reader may purge the duplicate responses and only send one copy of the device response to the network.

At 711, as the WTRU-reader indicates the cause for RRC connection establishment is for AIoT communication, the BS-reader may release the RRC connection shortly after it has received the device response message from the WTRU-reader.

In one example, a WTRU-reader may receive SIB1 then the SIB-AIoT.

As described herein, a higher layer may refer to one or more layers in a protocol stack, or a specific sublayer within the protocol stack. The protocol stack may comprise of one or more layers in a WTRU or a network node (e.g., eNB, gNB, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non-Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations (e.g., embodiments, methods, examples, etc.), one of ordinary skill in the art will appreciate that each feature or element can be used alone or in any combination with the other features and elements. For example, as disclosed herein there may be a method described in association with a figure for illustrative purposes, and one of ordinary skill in the art will appreciate that one or more features or elements from this method may be used alone or in combination with one or more features from another method described elsewhere. A symbol '/' (e.g., forward slash) may be used herein to represent 'and/or', where for example, 'A/B' may imply 'A and/or B'. As used herein, 'a' and 'an' and similar phrases are to be interpreted as 'one or more' and 'at least one'. Similarly, any term which ends with the suffix '(s)' is to be interpreted as 'one or more' and 'at least one'. The term 'may' is to be interpreted as 'may, for example' or indicate that something "does happen" or "can happen". In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

As disclosed herein, 'a' and 'an' and similar phrases are to be interpreted as 'one or more' and 'at least one'. Similarly, any term which ends with the suffix '(s)' is to be interpreted as 'one or more' and 'at least one'. The term 'may' is to be interpreted as 'may, for example'. A symbol '/' (e.g., forward slash) as used herein, unless otherwise indicated, represents 'and/or', where for example, 'A/B' may imply 'A and/or B'.

As described herein, "etc." may refer to etcetera, which is intended to reference any other like element in a list, or reference some other element disclosed herein. For example, if a list has "a, b, c, etc." and another list disclosed herein discloses "a, b, c, d, e" then it is intended that the "etc." may refer to at least "d, e" or "etc." may generally refer to other letters in the alphabet.

As described herein, "at least one of" may be interchangeable with "one or more of". As described herein, reference of a configuration may mean that at some point a WTRU may receive a message that includes configuration information. In one instance, the WTRU may provide feedback after having received it. In one instance, the WTRU may request the message. In one instance, the message may be unrequested.

What is claimed:

1. A method implemented by a wireless transmit receive unit (WTRU), the method comprising:
   - receiving an authorization message from a network function, wherein the authorization message indicates an authorization for the WTRU to act as an ambient internet of things (AIoT) reader;
   - receiving AIoT specific messaging from a base station;
   - broadcasting a trigger message to one or more AIoT devices;
   - receiving a response message from the one or more AIoT devices; and
   - forwarding the response message to the base station.

2. The method of claim 1, wherein the trigger message includes one or more device IDs of the one or more AIoT devices.

3. The method of claim 1, wherein the AIoT specific messaging includes a service request, wherein the trigger message includes the service request.

4. The method of claim 1, wherein the WTRU is in an IDLE state when receiving the response message, and the WTRU sends an RRC connection request to the base station prior to the forwarding, wherein the RRC connection request indicates that the RRC connection request is associated with an AIoT response.

5. The method of claim 1, wherein the WTRU returns to an IDLE state after forwarding the response message to the base station.

6. The method of claim 1, wherein the AIoT specific messaging is a paging message.

7. The method of claim 1, wherein the AIoT specific messaging is a system information block.

8. A wireless transmit receive unit (WTRU), the WTRU comprising:
   - a processor operatively coupled to a transceiver,
   - the processor and transceiver configured to receive an authorization message from a network function, wherein the authorization message indicates an authorization for the WTRU to act as an ambient internet of things (AIoT) reader;
   - the processor and transceiver configured to receive AIoT specific messaging from a base station;
   - the processor and transceiver configured to broadcast a trigger message to one or more AIoT devices;
   - the processor and transceiver configured to receive a response message from the one or more AIoT devices; and
   - the processor and transceiver configured to forward the response message to the base station.

9. The WTRU of claim 8, wherein the trigger message includes one or more device IDs of the one or more AIoT devices.

10. The WTRU of claim 8, wherein the AIoT specific messaging includes a service request, wherein the trigger message includes the service request.

11. The WTRU of claim 8, wherein the WTRU is in an IDLE state when receiving the response message, and the WTRU sends an RRC connection request to the base station prior to the forwarding, wherein the RRC connection request indicates that the RRC connection request is associated with an AIoT response.

12. The WTRU of claim 8, wherein the WTRU returns to an IDLE state after forwarding the response message to the base station.

13. The WTRU of claim 8, wherein the AIoT specific messaging is a paging message.

14. The WTRU of claim 8, wherein the AIoT specific messaging is a system information block.

15. A method implemented by a wireless transmit receive unit (WTRU), the method comprising:
   - receiving an authorization message from a network function, wherein the authorization message indicates an authorization for the WTRU to act as an ambient internet of things (AIoT) reader;
   - receiving AIoT specific messaging from a base station, wherein the AIoT specific messaging includes a service request, wherein the AIoT specific messaging is a paging message or a system information block;
   - broadcasting a trigger message to one or more AIoT devices, wherein the trigger message includes one or more device IDs of the one or more AIoT devices, wherein the trigger message includes the service request;
   - receiving a response message from the one or more AIoT devices, wherein the WTRU is in an IDLE state when receiving the response message;
   - sending an RRC connection request to the base station, wherein the RRC connection request indicates that the RRC connection request is associated with an AIoT response; and
   - forwarding the response message to the base station, wherein the WTRU returns to the IDLE state after forwarding the response message to the base station.

* * * * *